United States Patent Office.

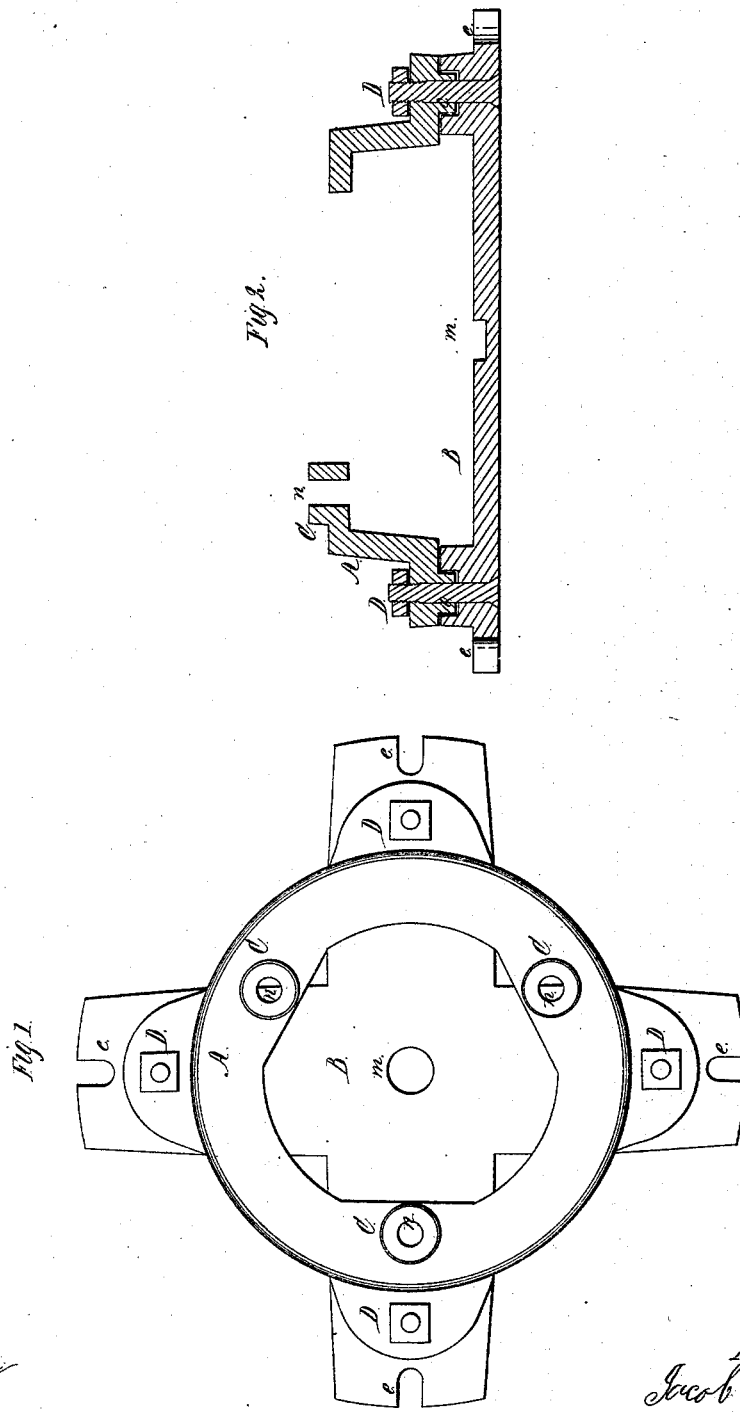

JACOB BISH, OF DAYTON, OHIO.

Letters Patent No. 68,691, dated September 10, 1867.

---

IMPROVEMENT IN HORSE-POWER.

---

*The Schedule referred to in these Letters Patent and making part of the same.*

---

TO ALL WHOM IT MAY CONCERN:

Be it known that I, JACOB BISH, of Dayton, in the county of Montgomery, in the State of Ohio, have invented an Improvement in what is known as Pelton's Treble-Geared Horse-Power; and I do hereby declare that the following is a full and exact description thereof, reference being had to the accompanying drawings, and the letters of reference marked thereon.

The nature of my invention consists in the manner of connecting the gear-frames so as to prevent breaking.

To enable others skilled in the art to make and use my invention, I will proceed to describe its construction and operation.

Figure 1 represents a top view of the frames as connected.

Figure 2 represents a transverse section of the same.

The same letters occurring on the different figures refer to like parts.

B represents the bottom part, which is attached to the mud-sills at the several slots $e$. In the centre at $m$ is a bearing for a vertical shaft. A represents the upper part of the gear-frame, which has three bosses C on its upper surface, and within which are fastened axles for as many wheels. A master-wheel gears into these wheels, and to which the horses are hitched by means of levers in the usual manner. At fig. 2 is shown the boss $o$ of the upper frame. The lower frame having a cavity corresponding with this boss, and the boss being let into this cavity and the bolts D passing through the frames and boss, a secure fastening is effected. It will be observed that the power exerted by the horses is expended on the bolts connecting the two frames, and as the Pelton horse-power has been constructed they are very liable to break, which is not the case when constructed as here shown and described.

What I claim as my invention, and desire to secure by Letters Patent, is—

The boss $o$ of the frame A, and the corresponding cavity of the frame B, and the relation of the bolt D to the same, in the manner substantially as described and for the purpose specified.

JACOB BISH.

Witnesses:
R. R. DICKEY,
THOS. D. MITCHELL.